US007357532B2

(12) United States Patent
Lin et al.

(10) Patent No.: US 7,357,532 B2
(45) Date of Patent: Apr. 15, 2008

(54) ADJUSTABLE LAMP MODULE AND IMAGE PROJECTOR APPLIED WITH THE LAMP MODULE

(75) Inventors: Ying-Fang Lin, Taoyuan (TW); Yueh-Jen Chen, Taipei (TW)

(73) Assignee: Qisda Corporation, Taoyuan (TW)

( * ) Notice: Subject to any disclaimer, the term of this patent is extended or adjusted under 35 U.S.C. 154(b) by 149 days.

(21) Appl. No.: 11/324,457

(22) Filed: Jan. 3, 2006

(65) Prior Publication Data

US 2006/0146543 A1    Jul. 6, 2006

(30) Foreign Application Priority Data

Jan. 3, 2005    (TW)    .............................. 94100102 A

(51) Int. Cl.
*F21V 19/02*    (2006.01)
(52) U.S. Cl. ...................... 362/285; 362/288; 362/289; 362/418; 362/419; 353/87
(58) Field of Classification Search ................ 362/285, 362/374, 85, 87, 277, 319, 287–289, 449, 362/457, 418, 419, 427, 428, 371, 372, 269, 362/323, 273, 275, 286, 429; 353/85, 87
See application file for complete search history.

(56) References Cited

U.S. PATENT DOCUMENTS 5,967,636 A * 10/1999 Stark et al. .................... 353/84

| 7,104,654 B2 * | 9/2006 | Tamaru et al. ................ 353/85 |
| 2002/0154278 A1* | 10/2002 | Masuda ...................... 353/101 |
| 2004/0165386 A1* | 8/2004 | Lee et al. .................... 362/285 |
| 2005/0146688 A1* | 7/2005 | Takemi ........................ 353/87 |

FOREIGN PATENT DOCUMENTS

JP    2005077621 A  *  3/2005

OTHER PUBLICATIONS

English Language Derwent Abstract of Japanese Publication JP2005077621A.*

* cited by examiner

*Primary Examiner*—Jong-Suk (James) Lee
*Assistant Examiner*—Kevin J. Spinella
(74) *Attorney, Agent, or Firm*—Thomas, Kayden, Horstemeyer & Risley

(57) ABSTRACT

A lamp module mounted on a housing is provided. The lamp module includes a lamp and a lamp sleeve. The plane perpendicular to an optical of the lamp has an x-axis direction and a y-axis direction mutually perpendicular to each other. The lamp is mounted within the lamp sleeve, and a positioning piece is formed at one end of the lamp sleeve for mounting the lamp sleeve on the housing. The positioning piece at least includes a first surface and a second surface respectively parallel to the x-axis direction and the y-axis direction. At least one of the first surface and the second surface is equipped with an adjustable apparatus for adjusting the alignment of the lamp by moving the positioning piece along the direction(s) of the x-axis or/and the y-axis. The adjustable apparatus comprises a positioning component, a fastener and an elastic component.

20 Claims, 4 Drawing Sheets

ADJUSTABLE LAMP MODULE AND IMAGE PROJECTOR APPLIED WITH THE LAMP MODULE

This application claims the benefit of Taiwan application Serial No. 094100102, filed Jan. 3, 2005, the subject matter of which is incorporated herein by reference.

BACKGROUND OF THE INVENTION

1. Field of the Invention

The invention relates in general to an adjustable lens module, and more particularly to an adjustable lens module and an image projector applied with the same.

2. Description of the Related Art

Along with a higher living standard is desired, home theater is gaining a wider and wider popularity. The image projector used in a home theater, such as a back projection TV for instance, is now experiencing a fierce competition. Therefore, how to produce an image projector to meet the consumer's high expectation of quality has become an imminent challenge to the manufacturers.

An image projector mainly includes a light source, an optical assembly, an imaging device and a lens module. The image projector functions by enabling the beam of light generated by the lamp to be projected to the imaging device via optical assembly, and then the beam of light is further reflected to the lens to generate an image. The optical assembly includes a color wheel, a condenser and a fold mirror. Examples of the imaging device include a digital micro-mirror device (DMD) and a liquid crystal display (LCD) panel. When the image projector functions, the optical path from the lamp to the imaging device has to be corrected, so that the luminance region generated when the beam of light is projected to the imaging device overlaps with the imaging device, enabling the image of the imaging device to be completely projected onto a screen via a lens of the lens module. If the lamp is erroneously positioned, the problems such as weakened brightness, poor imaging quality and evenness in distribution would arise.

Typically, there is no adjustable apparatus installed in the typical image projector for adjusting the illumination system. Normally, the lamp sleeve in which the lamp is mounted is directly mounted on the housing. For example, a positioning piece situated at one end of the lamp sleeve is secured at the housing via a screw. Once assembled, the components can no longer be adjusted. If the lamp sleeve is made of expensive materials, the manufacturing cost can not be decreased if the yield rate is low. Also, it is diffucult to optimizing the optical quality of the image projector and lack of flexibility of assembly without the adjustable lamp. Neither the single-lamp, nor the dual-lamp and nor the multi-lamp system is capable of optimizing the optical quality by adjusting the imaging system of the tube. The lamp has to be adjusted as well. According to the conventional method of mounting the lamp on the housing, the adjustment method is inflexible and the optimization of image projector is hard to achieve.

SUMMARY OF THE INVENTION

It is therefore the object of the invention to provide an adjustable lamp module applied to an image projector for quickly and easily adjusting the lamp module, so that the illumination system is situated at an optimum illumination position and the overall optical quality of the image projector can be optimally presented.

According to an object of the invention, an adjustable lamp module mounted on a housing is provided. The adjustable lamp includes a lamp and a lamp sleeve. A plane perpendicular to an optical axis of the lamp is defined by an x-axis and a y-axis. The lamp is mounted within the lamp sleeve, and a positioning piece is formed at one end of the lamp sleeve for mounting the lamp sleeve on the housing. The positioning piece has a first surface and a second surface parallel to the x-axis and the y-axis respectively. At least one of the first surface and the second surface is equipped with an adjustable apparatus for adjusting the alignment of the lamp by moving the positioning piece along the direction(s) of the x-axis or/and the y-axis. The adjustable apparatus includes a positioning component, a fastener and an elastic component. The positioning component situated on the surface of the positioning piece is parallel to a to-be-adjusted direction. The fastener situated on the other surface of the positioning piece is perpendicular to the to-be-adjusted direction. The elastic component is mounted on the fastener. During adjustment, the fastening direction of the fastener is parallel to the to-be-adjusted direction.

According to another object of the invention, an image projector including a housing, a lamp module for providing a beam of light, an optical assembly, an imaging component and a lens module is provided. The beam of light collected by the optical assembly is projected to the imaging component and then reflected to the lens module. The lamp module includes a lamp and a lamp sleeve. The plane perpendicular to an optical of the lamp is defined by an x-axis direction and a y-axis direction mutually perpendicular to each other. The lamp is mounted within the lamp sleeve, and a positioning piece is formed at one end of the lamp sleeve for mounting the lamp sleeve on the housing. The positioning piece at least includes a first surface and a second surface respectively parallel to the x-axis direction and the y-axis direction. At least one of the first surface and the second surface is equipped with an adjustable apparatus for adjusting the alignment of the lamp by moving the positioning piece along the direction(s) of the x-axis or/and the y-axis. The adjustable apparatus includes a positioning component, a fastener, and an elastic component. The positioning component situated on the surface of the positioning piece is parallel to the to-be-adjusted direction. The fastener situated on the other surface of the positioning piece is perpendicular to the to-be-adjusted direction. The elastic component is mounted on the fastener. During adjustment, the fastening direction of the fastener is parallel to the to-be-adjusted direction.

Other objects, features, and advantages of the invention will become apparent from the following detailed description of the preferred but non-limiting embodiments. The following description is made with reference to the accompanying drawings.

DETAILED DESCRIPTION OF THE INVENTION

The invention provides an adjustable lens module and an image projector applied with the lens module for quickly and efficiently adjusting the lamp module of the image projector. The lamp is adjusted to an optimum position for providing the image projector with an optimum brightness and excellent imaging quality. The lamp module of the invention is mainly adjusted along the direction(s) of an x-axis or/and a y-axis perpendicular to an optical axis (i.e. which is denoted as a z-axis in the embodiment). It is noted that the embodiments have been disclosed herein for illustrating the present invention, but not for limiting the scope of the present invention. Additionally, the drawings used for illustrating the embodiments of the present invention only show the major characteristic parts in order to avoid obscuring the present invention. Accordingly, the specification and the drawings are to be regard as an illustrative sense rather than a restrictive sense.

First Embodiment

In the first embodiment, the lamp module adjustable along the y-axis direction is illustrated in detail.

Figure 1A:
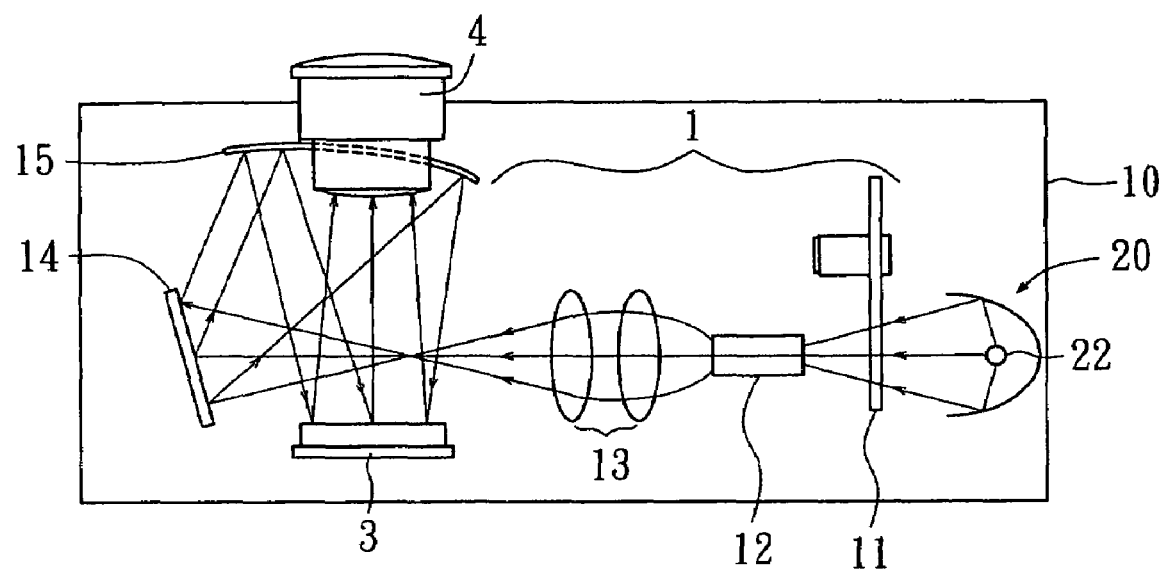
FIG. 1A is a diagram of an image projector according to an embodiment of the invention.

Referring to FIG. 1A, a diagram of an image projector according to an embodiment of the invention is shown. The image projector uses a housing 10 to be mounted with the main components including a lamp module 20, an optical assembly 1, an imaging component 3 and a lens module 4. When the image projector functions, a beam of light is generated by a lamp 22 of a lamp module 20, and then projected on the imaging component 3 after passing the optical assembly 1 and then reflected to the lens 4. The image of the imaging device is projected onto the screen via the lens 28 while the imaging component overlaps with the illumination region generated from the beam of light projected to the imaging component. The optical assembly includes a color wheel 11, a uniform tube 12, a condenser 13, a fold mirror 14 and a concave mirror 15 for instance. Examples of the imaging component 3 include a digital micro-mirror device (DMD) and a liquid crystal display panel. The optical path of the beam of light is shown in FIG. 1A.

Figure 1B:
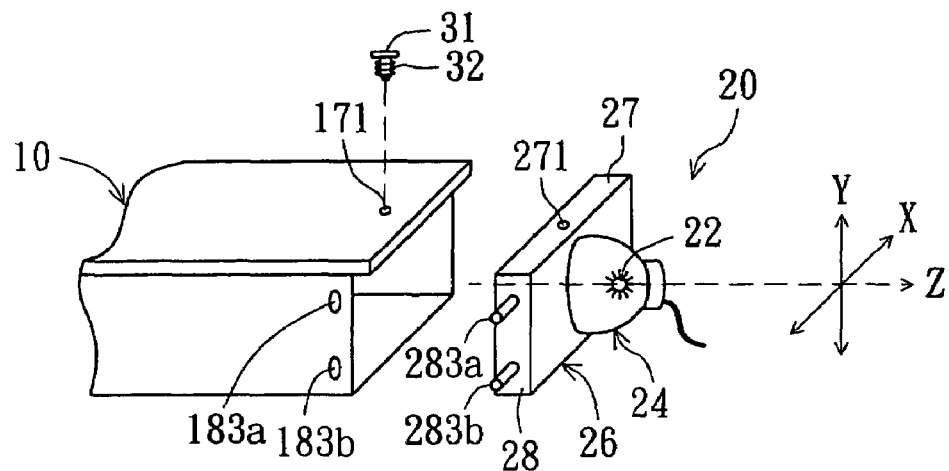
FIG. 1B is an assembly diagram of the lamp module and the housing of an image projector according to the first embodiment of the invention.

FIG. 1B is an assembly diagram of the lamp module and the housing of an image projector according to the first embodiment of the invention. As shown in FIG. 1B, the lamp module 20 includes a lamp 22 and a lamp sleeve 24. A plane perpendicular to an optical axis (i.e. the z-axis) of the lamp 22 is defined by an x-axis direction and a y-axis direction mutually perpendicular to each other. The lamp 22 is mounted within the lamp sleeve 24. A positioning piece 26 situated at one end of the lamp sleeve 24 is used for mounting the lamp sleeve 24 on the housing 10. The lamp sleeve 24 and the positioning piece 26 are preferably formed according to the one-piece molding method. The first surface 27 and the second surface 28 of the positioning piece 26 are respectively parallel to the x-axis direction and the y-axis direction in the first embodiment. At least one of the first surface 27 and the second surface 28 is equipped with an adjustable apparatus for adjusting the alignment of the lamp by moving the positioning piece 26 along the to-be adjusted direction (i.e. along the y-axis in the first embodiment). The adjustable apparatus includes a positioning component situated on the surface parallel to the to-be-adjusted direction. A fastener, on which an elastic component is mounted, is situated on the surface perpendicular to the to-be-adjusted direction. During adjustment, a fastening direction of the fastener is parallel to the to-be-adjusted direction.

In the first embodiment, the positioning component of the adjustable apparatus is a pair of positioning pins 283a and 283b disposed on the second surface 28. The protruding directions of the positioning pins are parallel to the x-axis direction. The fastener of the adjustable apparatus is a screw 31 for instance, and the elastic component is a spring 32 for instance. The first surface 27 has a screw hole 271 whose position corresponds to the screw 31.

Besides, the housing 10 has a pair of adjusting holes 183a and 183b positioned corresponding to the positioning pins 283a and 283b, respectively. The housing 10 also has a hole 171 corresponds to the screw hole 271.

Figure 1C:
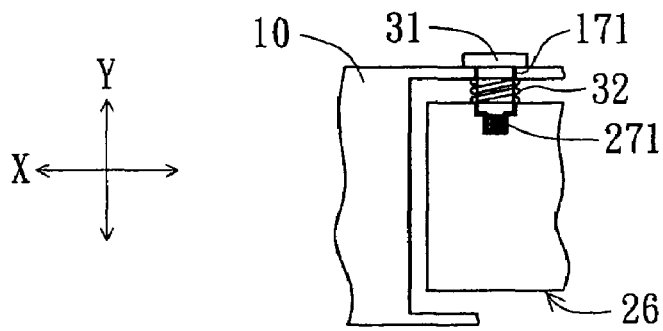
FIG. 1C is an enlarged cross-sectional view of partially showing the lamp module and the housing after assembly according to the first embodiment of the invention.

During assembly, the positioning piece 26 is moved towards the housing 10 for enabling the positioning pins 283a and 283b to respectively pass through the adjusting holes 183a and 183b. Then, the screw 31 passing through the hole 171 is mounted with the spring 32 and then secured at the screw hole 271. FIG. 1C is an enlarged cross-sectional view of partially showing the lamp module and the housing after assembly according to the first embodiment of the invention. After assembly, the spring 32 mounted on the screw 31 is positioned between the positioning piece 26 and the housing 10. By screwing the screw 31 to change the distance between the positioning piece 26 and the housing 10, the positioning piece 26 can be adjustably moved along the y-axis direction. The deeper the screw 31 is screwed, the tighter the spring 32 is compressed, and the smaller the distance will be consequently. Besides, when the positioning piece 26 is moved along the y-axis direction by screwing the screw 31, the positioning pins 283a and 283b are respectively moved within the adjusting holes 183a and 183b. In the first embodiment, it is preferred that each of the positioning pins 283a and 283b is a cylindrical object, and each of the adjusting holes 183a and 183b is oval-shaped; also, the diameter of the cylindrical object is preferably equal to the minor axis of the oval-shaped adjusting hole. After the alignment of the positioning piece 26 along the y-axis direction is completed, the screw 31 and the positioning pins 283a and 283b can be glued and fixed.

Besides, if a regular screw is used to be screwed tightly, the spring 32 mounted on the regular screw will be completely compressed. If a shoulder screw on which the spring 32 is mounted is used, a predetermined distance can be provided by the shoulder screw for receiving the compressed spring 32. However, the invention does not specify the types of screws. In the practical application, a variety of screws can be applied to achieve the object of adjustment.

Figure 2:
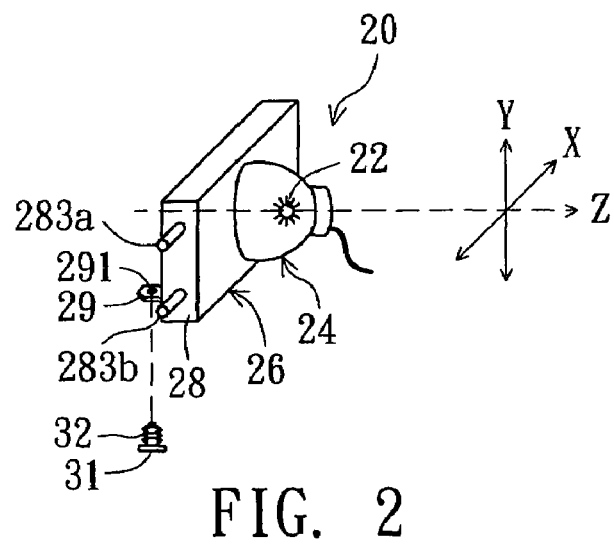
FIG. 2 is a diagram of another lamp module according to the first embodiment of the invention.

Although the screw hole 271 formed on the first surface of the positioning piece 26 is taken for illustration in the first embodiement, the invention is not limited thereto. It is noted that the other mechanism can be introduced into the lamp module. FIG. 2 is a diagram of another lamp module according to the first embodiment of the invention. As shown in FIG. 2, a base 29 can be formed at the lower end of the positioning piece 26. The base 29 has a hole 291 formed thereon. During assembly, the base 29 abuts against the bottom of the housing 10. The screw 31, passing through the hole 291 and mounted with the spring 32, is positioned at a screw hole on the bottom of the housing 10. Therefore, as long as the fastening direction of the fastener (i.e. the screw 31) is parallel to the to-be-adjusted y-axis direction during adjustment, the object of adjusting the lamp module can be achieved.

Second Embodiment

In the second embodiment, the lamp module adjustable along the x-axis direction is illustrated in detail. Additionally, the same components depicted in the first and second embodiments are denoted by the same reference numbers.

Figure 3A:
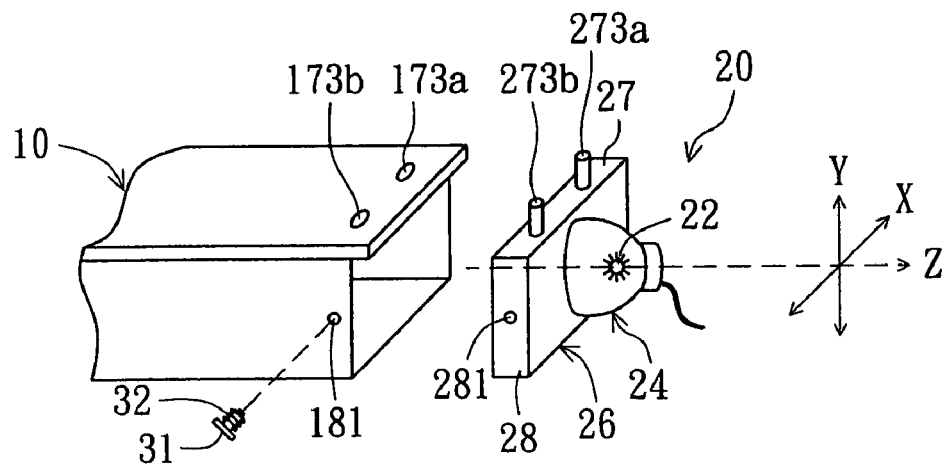
FIG. 3A is an assembly diagram of the lamp module and the housing of an image projector according to the second embodiment of the invention.

As shown in FIG. 3A, the lamp module 20 includes a lamp 22 and a lamp sleeve 24. A plane perpendicular to an optical axis (the z-axis) of the lamp 22 is defined by an x-axis direction and a y-axis direction mutually perpendicular to each other. The lamp 22 is mounted within the lamp sleeve 24. A positioning piece 26 situated at one end of the lamp sleeve 24 is used for mounting the lamp sleeve 24 on the housing 10. The lamp sleeve 24 and the positioning piece 26 are preferably formed according to one-piece molding method. Like the first embodiment, in the second embodiment, the first surface 27 and the second surface 28 of the positioning piece 26 are respectively parallel to the x-axis direction and the y-axis direction. At least one of the first surface 27 and the second surface 28 is equipped with an adjustable apparatus for adjusting the alignment of the lamp by moving the positioning piece 26 along the x-axis direction.

The adjustable apparatus includes a positioning component situated on the surface parallel to the to-be-adjusted direction. A fastener, mounted with an elastic component, is situated on the surface perpendicular to the to-be-adjusted direction. During adjustment, a fastening direction of the fastener is parallel to the to-be-adjusted direction. Therefore, in the second embodiment, the positioning component of the adjustable apparatus is a pair of positioning pins 273a and 273b disposed on the first surface 27. The protruding directions of the positioning pins are parallel to the y-axis direction. The fastener of the adjustable apparatus is a screw 31 for instance, and the elastic component is a spring 32 for instance. A screw hole 281 is formed on the second surface 28. The housing 10 has a pair of adjusting holes 173a and 173b positioned corresponding to the positioning pins 273a and 273b, respectively. The housing 10 also has a hole 181 corresponds to the screw hole 281.

Figure 3B:
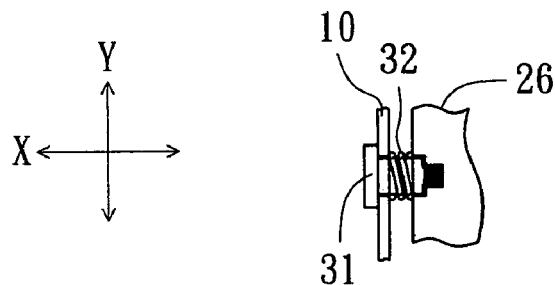
FIG. 3B is an enlarged cross-sectional view of partially showing the lamp module and the housing after assembly according to the second embodiment of the invention.

During assembly, the positioning piece 26 is moved towards the housing 10 for enabling the positioning pins 273a and 273b to respectively pass through the adjusting holes 173a and 173b. Then, the screw 31 passing through the hole 181 is mounted with the spring 32 and then secured at the screw hole 281. FIG. 3B is an enlarged cross-sectional view of partially showing the lamp module and the housing after assembly according to the second embodiment of the invention. After assembly, the spring 32 mounted on the screw 31 is positioned between the positioning piece 26 and the housing 10.

By screwing the screw 31 to change the distance between the positioning piece 26 and the housing 10, the positioning piece 26 can be adjustably moved along the x-axis direction. The deeper the screw 31 is screwed, the tighter the spring 32 is compressed, and the smaller the distance between the positioning piece 26 and the housing 10 will be consequently. Besides, when the positioning piece 26 is moved along the x-axis direction by screwing the screw 31, the positioning pins 273a and 273b are respectively moved within the adjusting holes 173a and 173b with the direction of movement being parallel to the x-axis direction. In the second embodiment, it is preferred that each of the positioning pins 273a and 273b is a cylindrical object, and each of the adjusting holes 173a and 173b is oval-shaped; also, the diameter of the cylindrical object is preferably equal to the minor axis of the oval-shaped adjusting hole. After the alignment of the positioning piece 26 along the x-axis direction is completed, the screw 31 and the positioning pins 273a and 273b can be glued and fixed.

Figure 4:
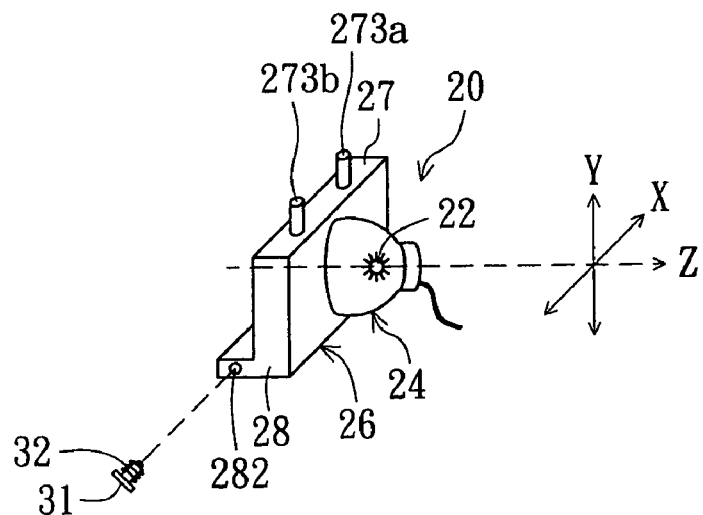
FIG. 4 is a diagram of another lamp module according to the second embodiment of the invention.

Although FIG. 3A and FIG. 3B are exemplified by forming the screw hole 281 on the second surface 28 of the positioning piece 26, and the second surface 28 is a rectangular form, the invention is not limited thereto. FIG. 4 is a diagram of another lamp module according to the second embodiment of the invention. As shown in FIG. 4, the positioning piece 26 is an L-shaped object, the second surface 28 is L-shaped, and the screw hole 282 is formed at the front end of the L-shaped second surface 28. It is, of course, understood that the hole on the housing is positioned correspondingly to the screw hole 282. During assembly, after the L-shaped positioning piece 26 presses against the housing 10, the screw 31 passes through the hole to be mounted with the spring 32, and then the screw 31 is secured at the screw hole 282. In addition to the foregoing method, the design (i.e. having the base 29) depicted in FIG. 2 can be adopted. The alignment of the lamp module can be achieved by forming a hollowed base parallel to the y-axis, wherein the hollowed base can be formed on a lateral side of the positioning piece 26 for enabling the fastening direction of the screw 31 to be parallel to the to-be-adjusted x-axis direction. During assembly, the base can be mounted on the exterior of the housing, the screw 31 passes through the hole disposed on the base to be mounted with the spring, and then the screw 31 is secured at a screw hole on the wall of the housing.

Third Embodiment

In the third embodiment, the lamp module adjustable along both the x-axis direction and the y-axis direction is illustrated in detail. During adjustment, the position of the lamp module in one of the two axes is aligned first, and then the position of the lamp module in another axis is aligned.

Figure 5:
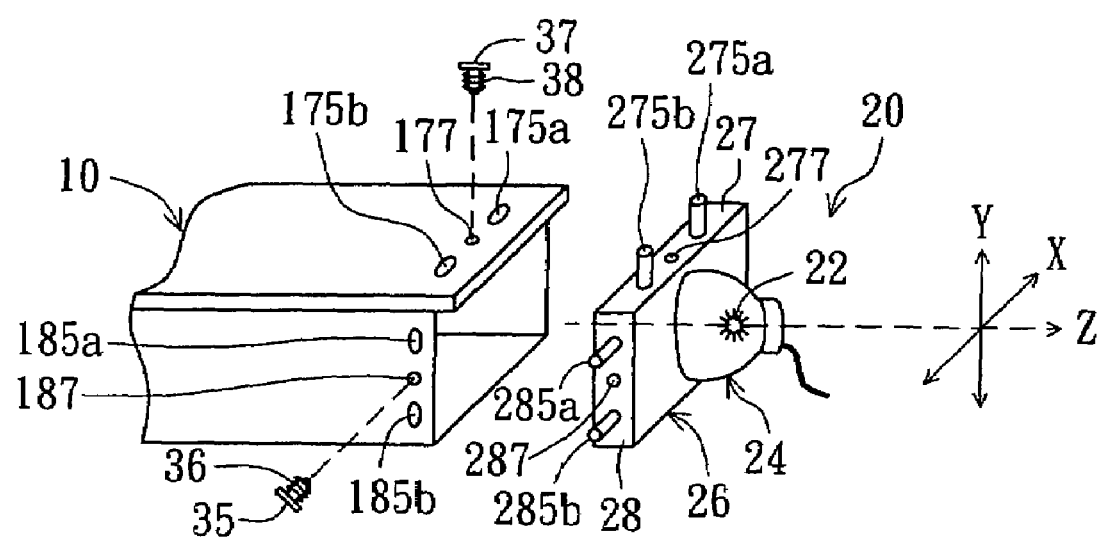
FIG. 5 is an assembly diagram of the lamp module and the housing of an image projector according to the third embodiment of the invention.

As shown in FIG. 5, the plane defined by an x-axis direction and a y-axis direction mutually perpendicular to each other is perpendicular to an optical axis (the z-axis). A lamp 22 is mounted within a lamp sleeve 24, and a positioning piece 26 is formed at one end of the lamp sleeve 24 for mounting the lamp sleeve 24 on the housing 10. The lamp sleeve 24 and the positioning piece 26 are preferably formed according to one-piece molding method. The first surface 27 and the second surface 28 of the positioning piece 26 are respectively parallel to the x-axis direction and the y-axis direction. The third embodiment combines the designs of the first and second embodiments to achieve the two-dimensional alignment of the lamp by moving the positioning piece 26 along the directions of the x-axis and the y-axis.

In the third embodiment, the first positioning component is a pair of first positioning pins 275a and 275b situated on the first surface 27 for instance, and the first fastener is a first screw 35 for instance. The first fastener, after being mounted with a first elastic component such as a first spring 36, is secured at the second surface 28 with the fastening direction being parallel to the x-axis direction. The second positioning component is a pair of second positioning pins 285a and 285b situated on the second surface 28 for instance, and the second fastener is a second screw 37 for instance. The second fastener, after being mounted by a second elastic component such as a second spring 38, is secured at the first surface 27 with the fastening direction being parallel to the y-axis direction.

The housing 10 has a pair of first adjusting holes 175a and 175b and a pair of second adjusting holes 185a and 185b. The first adjusting holes 175a and 175b are corresponding to the first positioning pins 275a and 275b, while the second adjusting holes 185a and 185b are corresponding to the second positioning pins 285a and 285b respectively In addition to a first hole 187 whose position corresponds to a first screw hole 287 disposed on the second surface 28, the housing 10 further has a second hole 177 whose position corresponds to a second screw hole 277 disposed on the first surface 27.

During assembly, the lamp module 20 is moved towards the housing 10 for enabling the first positioning pins 275a and 275b as well as the second positioning pins 285a and 285b to pass through the first adjusting holes 175a and 175b as well as the second adjusting holes 185a and 185b respectively. Next, the first screw 35 passes through the first hole 187 to be mounted with the first spring 36, and then the first screw 35 is secured at the first screw hole 287. Similarly, the second screw 37 passes through the second hole 177 to be mounted with the second spring 38, and then the screw 37 is secured at the second screw hole 277. Following the foregoing procedure, both the first spring 36 mounted on the first screw 35 and the second spring 38 mounted on the second screw 37 are positioned between the positioning piece 26 and the housing 10 after assembly.

When the first fastener such as the first screw 35 is adjusted, the positioning piece 28 is moved along the x-axis direction. Meanwhile, the first positioning pins 275a and 275b are respectively moved within the first adjusting holes 175a and 175b, and the direction of movement is parallel to the x-axis direction. When the second fastener such as the second screw 37 is adjusted, the positioning piece 28 is moved along the y-axis direction. Meanwhile, the second positioning pins 285a and 285b are also moved respectively within the second adjusting holes 185a and 185b, and the direction of movement is parallel to the y-axis direction.

Nonetheless, the design of FIG. 2 or FIG. 4 can be optionally applied in the third embodiment to achieve the object of adjusting the alignment of lamp. Provided that the fastening direction of the first fastener is parallel to the x-axis direction and that the fastening direction of the second fastener is parallel to the y-axis direction, the alignment of the positioning piece 26 can be adjusted by moving the first fastener and the second fastener along the x-axis direction and the y-axis direction, respectively.

In the practical application, the shape of the positioning piece 26 is not limited to the shapes exemplified in the above embodiments, and the positioning of the positioning component can be adjusted to match the mechanical structure practically.

Besides the manual operation to adjust the fastener, a step device can be used to achieve an automatic adjustment. For example, a step device whose position corresponding to the fastener can be disposed on the housing for adjusting the securing degree of the fastener. The step device is a cam, a rack or a chain for instance, and the fastener is a toothed screw, which can be engaged with the cam, the rack or the chain correspondingly. When the cam, the rack or the chain rotates, the fastener is secured or loosened for adjusting the position of the positioning piece.

Additionally, a calibration mechanism can be used in the practical application. For example, a photo receiver is disposed in front of the optical components to check and find out the optimum position for the lamp module 20. After the alignment along the x-axis direction or/and y-axis direction is completed, the screw can be glued and fixed.

According to the aforementioned descriptions, the lamp module equipped with an adjustable apparatus is capable of easily and efficiently adjusting the alignment of lamp to provide an optimum illumination position for the illumination system. When the adjustable apparatus is applied to an image projector, the assembly of parts and components is easy and convenient, further decreasing the manufacturing cost. Furthermore, when the light bulb needs to be replaced after the alignment of lamp is completed, the user only needs to replace the bulb with a new one without considering the derivation of illumination system after replacement. Therefore, the invention possesses the advantages of time-saving and cost-saving in the practical application.

While the invention has been described by way of examples and in terms of the embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lamp module mounted on a housing, and the lamp module comprising:

a lamp, wherein a plane perpendicular to an optical axis of the lamp is defined by an x-axis direction and a y-axis direction mutually perpendicular to each other; and a lamp sleeve in which the lamp is mounted, wherein a positioning piece is formed at one end of the lamp sleeve for mounting the lamp sleeve on the housing, and the positioning piece comprises:

a first surface and a second surface respectively parallel to the x-axis direction and the y-axis direction, wherein at least one of the first surface and the second surface is equipped with an adjustable apparatus for adjusting the alignment of the lamp by moving the positioning piece along at least one direction the x-axis and the y-axis, and the adjustable apparatus comprises:

a positioning component situated on the surface of the positioning piece parallel to the to-be-adjusted direction;

a fastener situated on the other surface of the positioning piece perpendicular to the to-be-adjusted direction, and the fastener fastened into the positioning piece through the housing; and an elastic component mounted on the fastener, and disposed between the housing and the positioning piece, wherein a fastening direction of the fastener is parallel to the to-be-adjusted direction during adjustment, and a distance between the housing and the positioning piece is adjustable and determined according to compression condition of the elastic component.

2. The lamp module according to claim 1, wherein when the movement of the positioning piece along the x-axis direction is to be adjusted, the positioning component is situated on the first surface, and the fastener is situated on the second surface for enabling the fastening direction to be parallel to the x-axis direction.

3. The lamp module according to claim 2, wherein the positioning component is a pair of positioning pins whose protruding directions are parallel to the y-axis direction.

4. The lamp module according to claim 3, wherein the housing has a pair of adjusting holes positioned correspondingly to the pair of positioning pins, and the pair of positioning pins are moved within the pair of adjusting holes when the positioning piece is moved along the x-axis direction.

5. The lamp module according to claim 1, wherein when the movement of the positioning piece along the y-axis direction is to be adjusted, the positioning component is situated on the second surface, and the fastener is situated on the first surface for enabling the fastening direction to be parallel to the y-axis direction.

6. The lamp module according to claim 5, wherein the positioning component is a pair of positioning pins whose protruding directions are parallel to the x-axis direction.

7. The lamp module according to claim 6, wherein the housing has a pair of adjusting holes positioned correspondingly to the pair of positioning pins, and the pair of positioning pins are moved within the pair of adjusting holes when the positioning piece is moved along the y-axis direction.

8. The lamp module according to claim 1, wherein the adjustable apparatus comprises:
   a first positioning component situated on the first surface;
   a first fastener situated on the second surface with the fastening direction being parallel to the x-axis direction;
   a first elastic component mounted on the first fastener;
   a second positioning component situated on the second surface;
   a second fastener situated on the first surface with the fastening direction being parallel to the y-axis direction; and
   a second elastic component mounted on the second fastener;
   when adjusting the first fastener, the positioning piece is moved along the x-axis direction; and
   when adjusting the second fastener, the positioning piece is moved along the y-axis direction.

9. The lamp module according to claim 8, wherein the housing comprises:
   a first adjusting hole whose position is corresponding to the first positioning component, wherein the first positioning component is moved within the first adjusting hole when the positioning piece is moved along the x-axis direction; and
   a second adjusting hole whose position is corresponding to the second positioning component, wherein the second positioning component is moved within the second adjusting hole when the positioning piece is moved along the y-axis direction.

10. An image projector, comprising:
    a housing;
    a lamp module, comprising:
       a lamp for providing a beam of light, wherein a plane perpendicular to an optical axis of the lamp is defined by an x-axis direction and a y-axis direction mutually perpendicular to each other; and
       a lamp sleeve in which the lamp is mounted, wherein a positioning piece is formed at one end of the lamp sleeve for mounting the lamp sleeve on the housing, and the positioning piece comprises:
          a first surface and a second surface respectively parallel to the x-axis direction and the y-axis direction, at least one of the first surface and the second surface is equipped with an adjustable apparatus for adjusting the alignment of the lamp by moving the positioning piece along at least one direction the of the x-axis and the y-axis, and the adjustable apparatus comprises:
             a positioning component situated on the surface of the positioning piece parallel to the to-be-adjusted direction;
             a fastener situated on the other surface of the positioning piece perpendicular to the to-be-adjusted direction, and the fastener fastened into the positioning piece through the housing; and
             an elastic component mounted on the fastener, and disposed between the housing and the positioning piece, wherein a fastening direction of the fastener is parallel to the to-be-adjusted direction during adjustment, and a distance between the housing and the positioning piece is adjustable and determined according to compression condition of the elastic component;
    an optical assembly;
    an imaging component; and
    a lens module, wherein the beam of light collected by the optical assembly is projected to the imaging component and then reflected to the lens module.

11. The image projector according to claim 10, wherein when the movement of the positioning piece along the x-axis direction is to be adjusted, the positioning component is situated on the first surface, and the fastener is situated on the second surface for enabling the fastening direction to be parallel to the x-axis direction.

12. The image projector according to claim 11, wherein the positioning component is a pair of positioning pins whose protruding directions are parallel to the y-axis direction.

13. The image projector according to claim 12, wherein the housing has a pair of adjusting holes positioned corresponding to the pair of positioning pins, and the pair of positioning pins are moved within the pair of adjusting holes when the positioning piece are moved along the x-axis direction.

14. The image projector according to claim 10, wherein when the movement of the positioning piece along the y-axis direction is to be adjusted, the positioning component is situated on the second surface, and the fastener is situated on the first surface for enabling the fastening direction to be parallel to the y-axis direction.

15. The image projector according to claim 14, wherein the positioning component is a pair of positioning pins whose protruding directions are parallel to the x-axis direction.

16. The image projector according to claim 15, wherein the housing has a pair of adjusting holes positioned corresponding to the pair of positioning pins, and the pair of positioning pins are moved within the pair of adjusting holes when the positioning piece are moved along the y-axis direction.

17. The image projector according to claim 10, wherein the adjustable apparatus comprises:

a first positioning component situated on the first surface;

a first fastener situated on the second surface with the fastening direction being parallel to the x-axis direction;

a first elastic component mounted on the first fastener;

a second positioning component situated on the second surface;

a second fastener situated on the first surface with the fastening direction being parallel to the y-axis direction; and a second elastic component mounted on the second fastener;

when adjusting the first fastener, the positioning piece is moved along the x-axis direction;

when adjusting the second fastener, the positioning piece is moved along the y-axis direction.

18. The image projector according to claim 17, wherein the housing comprises:

a first adjusting hole whose position is corresponding to the first positioning component, wherein the first positioning component is moved within the first adjusting hole when the positioning piece is moved along the x-axis direction; and a second adjusting hole whose position is corresponding to the second positioning component, wherein the second positioning component is moved within the second adjusting hole when the positioning piece is moved along the y-axis direction.

19. The image projector according to claim 10, wherein the optical assembly comprises a color wheel, a condenser, and a fold mirror.

20. The image projector according to claim 10, wherein the imaging component is a digital micro-mirror device (DMD).

* * * * *